(12) United States Patent
Rom et al.

(10) Patent No.: US 11,557,835 B2
(45) Date of Patent: Jan. 17, 2023

(54) APPARATUS FOR TRANSMITTING AND/OR RECEIVING RADIO FREQUENCY SIGNALS AND METHOD OF OPERATING SUCH APPARATUS

(71) Applicant: Nokia Technologies OY, Espoo (FI)

(72) Inventors: Christian Rom, Aalborg (DK); Benny Vejlgaard, Gistrup (DK); Simon Svendsen, Aalborg (DK); Samantha Caporal del Barrio, Aalborg (DK); Filipa Fernandes, Aalborg (DK); Johannes Harrebek, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 19 days.

(21) Appl. No.: 16/928,181

(22) Filed: Jul. 14, 2020

(65) Prior Publication Data
US 2021/0028540 A1 Jan. 28, 2021

(30) Foreign Application Priority Data

Jul. 22, 2019 (EP) .................................... 19187648

(51) Int. Cl.
*H01Q 3/12* (2006.01)
*H01Q 3/24* (2006.01)
*H01Q 21/28* (2006.01)

(52) U.S. Cl.
CPC .................. *H01Q 3/12* (2013.01); *H01Q 3/24* (2013.01); *H01Q 21/28* (2013.01)

(58) Field of Classification Search
CPC ............ H01Q 3/12; H01Q 3/24; H01Q 21/28; H01Q 1/243; H04B 7/0825; H04B 7/0602
See application file for complete search history.

(56) References Cited

U.S. PATENT DOCUMENTS 5,940,454 A 8/1999 Mcnicol et al.
5,991,643 A * 11/1999 Chao-Cheng ........ H04B 7/0602
343/702

(Continued)

FOREIGN PATENT DOCUMENTS

CN 1653784 A 8/2005
CN 101740868 A 6/2010

(Continued)

OTHER PUBLICATIONS

A. Aslam and F. A. Bhatti, "Improved design of linear microstrip patch antenna array," Proceedings of the 9th International Symposium on Antennas, Propagation and EM Theory, 2010, pp. 302-306, doi: 10.1109/ISAPE.2010.5696460. (Year: 2010).*

(Continued)

*Primary Examiner* — Dameon E Levi
*Assistant Examiner* — Leah Rosenberg
(74) *Attorney, Agent, or Firm* — Harness, Dickey & Pierce, P.L.C.

(57) ABSTRACT

Apparatus for transmitting and/or receiving radio frequency, RF, signals, particularly for a mobile radio device for a wireless communications system, particularly a cellular communications system, said apparatus comprising a primary antenna module having a first radiation pattern, at least one secondary antenna module having a second radiation pattern, which is different from said first radiation pattern, and a control unit configured to selectively activate and/or deactivate said primary antenna module and/or said at least one secondary antenna module.

15 Claims, 6 Drawing Sheets

(56) References Cited

U.S. PATENT DOCUMENTS

| | | | |
|---|---|---|---|
| 6,721,550 | B1 | 4/2004 | Okada et al. |
| 8,223,072 | B2 | 7/2012 | Ponnuswamy |
| 9,900,135 | B2* | 2/2018 | Lee ............... H04B 7/0417 |
| 2004/0150569 | A1* | 8/2004 | Proctor, Jr. ........ H01Q 19/32 |
| | | | 343/702 |
| 2005/0136929 | A1 | 6/2005 | Iacono et al. |
| 2009/0295648 | A1* | 12/2009 | Dorsey ............. H01Q 21/28 |
| | | | 343/702 |
| 2010/0087146 | A1 | 4/2010 | Han et al. |
| 2010/0231473 | A1 | 9/2010 | Shtrom et al. |
| 2014/0010156 | A1 | 1/2014 | Chuang et al. |
| 2015/0188599 | A1* | 7/2015 | Shi .................... H04L 1/18 |
| | | | 455/78 |
| 2016/0269132 | A1 | 9/2016 | Clark et al. |
| 2018/0277963 | A1 | 9/2018 | Desclos et al. |

FOREIGN PATENT DOCUMENTS

| | | |
|---|---|---|
| CN | 104904134 A | 9/2015 |
| CN | 204927534 U | 12/2015 |
| CN | 105577223 A | 5/2016 |
| CN | 106165310 A | 11/2016 |
| CN | 107710641 A | 2/2018 |
| CN | 109347524 A | 2/2019 |
| JP | 2005167910 A | 6/2005 |
| JP | 2011071646 A | 4/2011 |
| JP | 2014-236915 A | 12/2014 |
| KR | 20190020501 A | 3/2019 |
| WO | 03/077358 A2 | 9/2003 |
| WO | 2018/091203 A1 | 5/2018 |

OTHER PUBLICATIONS

"3rd Generation Partnership Project; Technical Specification Group Radio Access Network; NR; Radio Resource Control (RRC) protocol specification (Release 15)", 3GPP TS 38.331, V15.4.0, Dec. 2018, pp. 1-474. (Year: 2018).*

"Webinar—Breaking the Wireless Barriers to Mobilize 5G NR mmWave", Qualcomm, Jan. 2019, 39 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.4.0, Dec. 2018, pp. 1-933.

Martikainen et al., "On the Basics of Conditional Handover for 5G Mobility", IEEE 29th Annual International Symposium on Personal, Indoor and Mobile Radio Communications (PIMRC), 2018, 7 pages.

Huo et al., "5G Cellular User Equipment: From Theory to Practical Hardware Design", IEEE Access, vol. 5, 2017, pp. 13992-14010.

Ranvier et al., "Low-Cost Planar Omnidirectional Antenna for mm-Wave Applications", IEEE Antennas and Wireless Propagation Letters, vol. 7, 2008, pp. 521-523.

Lin et al., "Compact, Omni-directional, Circularly-polarized mm-Wave Antenna for Device-to-Device (D2D) Communications in Future 5G Cellular Systems", 10th Global Symposium on Millimeter-Waves, 2017, pp. 115-116.

Rappaport et al., "Overview of Milimeter Wave Communications for Fifth-Generation (5G) Wireless Networks—with a focus on Propagation Models", IEEE Transactions on Antennas and Propagation, vol. 65, No. 12, Dec. 2017, pp. 6213-6230.

He et al., "Channel Analysis for Millimiter-Wave Railway Communications in Urban Environment", XXXIInd General Assembly and Scientific Symposium of the International Union of Radio Science (URSI GASS), 2017, 4 pages.

Catarinucci et al., "An Energy-efficient MAC Scheduler Based on a Switched-beam Antenna for Wireless Sensor Networks", Journal of Communications Software and Systems, vol. 9, No. 2, Jun. 2013, pp. 117-127.

"3rd Generation Partnership Project; Technical Specification Group Radio Access Network; NR; Radio Resource Control (RRC) protocol specification (Release 15)", 3GPP TS 38.331, V15.4.0, Dec. 2018, pp. 1-474.

"3rd Generation Partnership Project; Technical Specification Group Radio Access Network; NR; User Equipment (UE) radio transmission and reception; Part 2: Range 2 Standalone (Release 15)", 3GPP TS 38.101-2, V15.2.0, Jun. 2018, pp. 1-68.

"3rd Generation Partnership Project; Technical Specification Group Radio Access Network; NR; NR and NG-RAN Overall Description; Stage 2 (Release 15)", 3GPP TS 38.300, V15.6.0, Jun. 2019, pp. 1-99.

Partial European Search Report received for corresponding European Patent Application No. 19187648.1, dated Dec. 4, 2019, 14 pages.

Kang et al., "Electric and Magnetic Mode-Switchable Dual Antenna for Null Compensation", IEEE Antennas and Wireless Propagation Letters, vol. 12, 2013, pp. 300-303.

"Clarification on SSB—ToMeasure bitmap in SMTC configuration", 3GPP TSG-RAN WG2 Meeting #101, R2•1802023, Agenda: 10.4.1.4.1, ZTE Corporation, Feb. 26-Mar. 2, 2018, 5 pages.

Extended European Search Report received for corresponding European Patent Application No. 19187648.1, dated Feb. 27, 2020, 13 pages.

Office action received for corresponding Chinese Patent Application No. 202010714688.5, dated Sep. 3, 2021, 8 pages of office action and 4 pages of translation available.

Office Action dated Jul. 15, 2022 in Chinese Application No. 202010714688.5.

Office Action dated Feb. 23, 2022 issued in corresponding Chinese patent application No. 2020107146885.

* cited by examiner

|    | col1 | col2 | col3 | col4 | col5 | col6 | col7 | col8 | col9 | col10 | col11 | col12 | col13 | col14 |
|----|------|------|------|------|------|------|------|------|------|-------|-------|-------|-------|-------|
| L1 | X    |      |      |      | X    |      |      |      | X    |       |       |       | X     |       |
| L2 |      | X    |      |      |      | X    |      |      |      | X     |       |       |       | X     |
| L3 |      |      | X    |      |      |      | X    |      |      |       | X     |       |       |       |
| L4 |      |      |      | X    |      |      |      | X    |      |       |       | X     |       |       |
| L5 | X    | X    | X    | X    | X    | X    | X    | X    | X    | X     | X     | X     | X     | X     |

|    | col1 | col2 | col3 | col4 | col5 | col6 | col7 | col8 | col9 | col10 | col11 | col12 | col13 | col14 |
|----|------|------|------|------|------|------|------|------|------|-------|-------|-------|-------|-------|
| L1 | X    | X    | X    | X    | X    | X    | X    | X    | X    | X     | X     | X     | X     | X     |
| L2 |      | X    |      |      |      | X    |      |      |      | X     |       |       |       | X     |
| L3 |      |      | X    |      |      |      | X    |      |      |       | X     |       |       |       |
| L4 |      |      |      | X    |      |      |      | X    |      |       |       | X     |       |       |
| L5 | X    | X    | X    | X    | X    | X    | X    | X    | X    | X     | X     | X     | X     | X     |

APPARATUS FOR TRANSMITTING AND/OR RECEIVING RADIO FREQUENCY SIGNALS AND METHOD OF OPERATING SUCH APPARATUS

CROSS-REFERENCE TO RELATED APPLICATION

This application claims the benefit of European patent application No. 19187648.1 filed on Jul. 22, 2019, titled "APPARATUS FOR TRANSMITTING AND/OR RECEIVING RADIO FREQUENCY SIGNALS AND METHOD OF OPERATING SUCH APPARATUS", the content of which is incorporated herein by reference in its entirety.

FIELD OF THE INVENTION

Exemplary embodiments relate to an apparatus for transmitting and/or receiving radio frequency, RF, signals. Further exemplary embodiments relate to a method of operating an apparatus for transmitting and/or receiving radio frequency, RF, signals.

BACKGROUND

Apparatus and methods of the aforementioned type can be used to process radio frequency, RF, signals, e.g. for mobile radio devices for cellular communications systems.

SUMMARY

The scope of protection sought for various embodiments of the invention is set out by the independent claims. The exemplary embodiments and features, if any, described in this specification, that do not fall under the scope of the independent claims, are to be interpreted as examples useful for understanding various exemplary embodiments of the invention.

Exemplary embodiments relate to an apparatus for transmitting and/or receiving radio frequency, RF, signals, said apparatus comprising a primary antenna module having a first radiation pattern, at least one secondary antenna module having a second radiation pattern, which is different from said first radiation pattern of said primary antenna module, and a control unit configured to selectively activate and/or deactivate said primary antenna module and/or said at least one secondary antenna module. This enables an increased operational flexibility and may, according to further exemplary embodiments, which are explained in detail further below, e.g. be used to extend a radio range and/or improve efficiency, e.g. by at least temporarily reducing a power consumption.

According to further exemplary embodiments, said apparatus may e.g. be used for mobile radio device(s), e.g. UEs (user equipments) for wireless communications systems, particularly cellular communications systems, such as e.g. according to the fifth generation (5G) standard. According to further exemplary embodiments, said apparatus may also be used in other mobile radio devices such as e.g. tablet computers, mobile personal computers (laptops, notebooks), modems for cellular communications networks, e.g. for (mobile) sensor devices, e.g. for sensor networks.

According to further exemplary embodiments, said apparatus may be configured to transmit and/or receive RF signals in a frequency range above 10 GHz (gigahertz) or above 15 GHz.

According to further exemplary embodiments, said apparatus may be configured to transmit and/or receive RF signals in the frequency range FR2 as defined by the standard 3GPP TS 38.101-2 V15.2.0 (2018-06), cf. e.g. Table 5.1-1 on p. 12.

According to further exemplary embodiments, said first radiation pattern is an omnidirectional radiation pattern, and said second radiation pattern is a non-omnidirectional radiation pattern.

As an example, according to further exemplary embodiments, an omnidirectional radiation pattern is a radiation pattern which is associated with gain levels G between Gmax −3 dB<G<Gmax for at least 70% (percent) of an angular space considered (full sphere or hemi-sphere), wherein Gmax represents the maximum gain of an antenna (module) with such radiation pattern.

As an example, according to further exemplary embodiments, a non-omnidirectional radiation pattern is a radiation pattern which is associated with gain levels G between Gmax −3 dB<G<Gmax for less than 70% (percent) of an angular space considered (full sphere or hemi-sphere), wherein Gmax represents the maximum gain of an antenna (module) with such radiation pattern.

According to further exemplary embodiments, said primary antenna module comprises a static radiation pattern, which e.g. cannot be changed, particularly cannot be changed dynamically, e.g. during an operation of said apparatus.

According to further exemplary embodiments, said primary antenna module comprises a monopole antenna, preferably a quarter-wavelength monopole antenna.

According to further exemplary embodiments, said at least one secondary antenna module comprises a radiation pattern, which can dynamically be changed, e.g. during an operation of said apparatus. As an example, said at least one secondary antenna module may be of the phased-array type.

According to further exemplary embodiments, said at least one secondary antenna module comprises at least one linear antenna array having two or more antenna elements, wherein preferably said two or more antenna elements are patch antenna elements.

According to further exemplary embodiments, said at least one secondary antenna module comprises at least one linear dual polarized patch array.

According to further exemplary embodiments, preferably if said at least one secondary antenna module comprises a plurality of linear (optionally dual polarized) patch arrays, at least two of said linear patch arrays are arranged in parallel to each other or orthogonal to each other.

According to further exemplary embodiments, said apparatus comprises two or three secondary antenna modules.

According to further exemplary embodiments, if there is more than one secondary antenna module, at least two of said secondary antenna modules may comprise similar or identical radiation pattern(s) or characteristic(s), respectively. According to further exemplary embodiments, at least two of said secondary antenna modules may comprise different radiation pattern(s) or characteristic(s), respectively.

According to further exemplary embodiments, said primary antenna module and said at least one secondary antenna module are arranged on and/or attached to a common carrier element. According to further exemplary embodiments, said common carrier element may comprise or represent a printed circuit board.

According to further exemplary embodiments, said control unit is configured to determine at least one of the following received power parameters: a) a received power of a received RF signal associated with said primary antenna module (e.g., an RF signal that has been (or is being) received via said primary antenna module), b) a received power of a received RF signal associated with said at least one secondary antenna module (e.g., an RF signal that has been (or is being) received via said at least one secondary antenna module), and to selectively activate and/or deactivate said primary antenna module and/or said at least one secondary antenna module depending on at least one of said received power parameters. This e.g. enables to at least temporarily activate such antennas or antenna module(s), which are associated with a comparatively great receive power level, while other antennas or antenna module(s) may at least temporarily be deactivated.

According to further exemplary embodiments, said control unit is configured to selectively activate and/or deactivate at least one component of said primary antenna module and/or at least one component of said at least one secondary antenna module depending on at least one of said received power parameters. This e.g. enables to at least temporarily deactivate one or more components, preferably active components (which dissipate electrical energy when activated) of such antennas or antenna module(s), which are associated with a comparatively small receive power level, while other antennas or antenna module(s) may at least temporarily be activated.

According to further exemplary embodiments, said at least one secondary antenna module may e.g. comprise at least one of the following elements: (preferably analog) phase shifter, power amplifier (PA), low noise amplifier (LNA).

According to further exemplary embodiments, when deactivating/activating said at least one secondary antenna module by means of said control unit, at least one of said phase shifter(s) and/or PA and/or LNA may be deactivated/activated. According to further exemplary embodiments, activating/deactivating may be performed by activating/deactivating an electrical energy supply of (e.g., a direct current supply voltage for) at least one of said elements.

According to further exemplary embodiments, said control unit is configured to: determine whether said received power of a received RF signal associated with said at least one secondary antenna module is less than or equal to a predetermined first threshold, and, if said received power of said received RF signal associated with said at least one secondary antenna module is less than or equal to said predetermined first threshold, activate said primary antenna module, wherein preferably, said control unit is configured to, if said received power of said received RF signal associated with said at least one secondary antenna module is greater than said predetermined first threshold, deactivate said primary antenna module.

According to further exemplary embodiments, said control unit may be configured to determine whether said primary antenna module is currently activated, prior to deactivating it.

According to further exemplary embodiments, said apparatus comprises two or more secondary antenna modules, wherein said control unit is configured to: determine whether a received power of a received RF signal associated with one of said secondary antenna modules is greater than a predetermined second threshold, and, if said received power of said received RF signal associated with said one of said secondary antenna modules is greater than said predetermined second threshold, deactivate a) at least one further secondary antenna module of said two or more secondary antenna modules (preferably all further secondary antenna modules) and/or b) said primary antenna module, wherein preferably, said control unit is configured to, if said received power of said received RF signal associated with said one of said secondary antenna modules is less than or equal to said predetermined second threshold, activate A) at least one further secondary antenna module of said two or more secondary antenna modules and/or B) said primary antenna module.

According to further exemplary embodiments, said control unit may be configured to determine whether at least one further secondary antenna module of said two or more secondary antenna modules and/or B) said primary antenna module is active, prior to deactivating it.

According to further exemplary embodiments, said control unit is further configured to determine a received power of a received RF signal associated with said at least one further secondary antenna module of said two or more secondary antenna modules, determine a received power of a received RF signal associated with said primary antenna module, to compare said received power of said received RF signal associated with said at least one further secondary antenna module with said received power of said received RF signal associated with said primary antenna module, and, optionally, to deactivate at least one of said at least one further secondary antenna module and said primary antenna module. This way, the "better" one—in terms of receive power level—of said at least one further secondary antenna module and said primary antenna module may be kept activated, while the other one(s) may be deactivated again.

According to further exemplary embodiments, said control unit is configured to control an electric energy supply to said primary antenna module and to said at least one secondary antenna module. Preferably, said control unit is configured to individually activate and deactivate an electric energy supply to said primary antenna module (or at least one component thereof) and to said at least one secondary antenna module (or at least one component thereof).

Further exemplary embodiments relate to a mobile radio device for a wireless communications system, particularly a cellular communications system, comprising at least one apparatus according to the embodiments. As an example, said mobile radio device may be a user equipment.

According to further exemplary embodiments, said radio device is configured to at least temporarily operate according to the standard 3GPP TS 38.331, V15.4.0, 2018-12, and to at least temporarily use at least said primary antenna module for a target cell search depending on synchronization signal blocks, SSB, according to the standard 3GPP TS 38.331, V15.4.0, 2018-12. This enables to attain low latency for a target cell search, as compared e.g. to a time division multiplexed (TDM) operation of two or more secondary antenna modules.

Further exemplary embodiments relate to a method of operating a mobile radio device for a wireless communications system, particularly a cellular communications system, comprising at least one apparatus according to the embodiments.

Further exemplary embodiments relate to a method of operating an apparatus for transmitting and/or receiving radio frequency, RF, signals, particularly for a mobile radio device for a wireless communications system, particularly a cellular communications system, said apparatus comprising a primary antenna module having a first radiation pattern, at least one secondary antenna module having a second radiation pattern, which is different from said first radiation pattern of said primary antenna module, and a control unit, wherein said method comprises: selectively activating and/or deactivating, by means of said control unit, said primary antenna module and/or said at least one secondary antenna module.

According to further exemplary embodiments, said primary antenna module and/or said at least one secondary antenna module may be activated in a time multiplexed manner, e.g. for performing a target cell search when using said apparatus for a mobile radio device (e.g., UE) for a cellular communications network.

According to further exemplary embodiments, said method further comprises: determining, by means of said control unit, at least one of the following received power parameters: a) a received power of a received RF signal associated with said primary antenna module, b) a received power of a received RF signal associated with said at least one secondary antenna module, and selectively activating and/or deactivating said primary antenna module and/or said at least one secondary antenna module depending on at least one of said received power parameters.

According to further exemplary embodiments, said method further comprises: determining, by means of said control unit, whether said received power of a received RF signal associated with said at least one secondary antenna module is less than or equal to a predetermined first threshold, and, if said received power of said received RF signal associated with said at least one secondary antenna module is less than or equal to said predetermined first threshold, activating said primary antenna module, wherein preferably, said method further comprises deactivating, by means of said control unit, said primary antenna module, if said received power of said received RF signal associated with said at least one secondary antenna module is greater than said predetermined first threshold.

According to further exemplary embodiments, said apparatus comprises two or more secondary antenna modules, and said control unit determines whether a received power of a received RF signal associated with one of said secondary antenna modules is greater than a predetermined second threshold, and, if said received power of said received RF signal associated with said one of said secondary antenna modules is greater than said predetermined second threshold, deactivates a) at least one further secondary antenna module of said two or more secondary antenna modules and/or b) said primary antenna module, wherein preferably, said control unit, if said received power of said received RF signal associated with said one of said secondary antenna modules is less than or equal to said predetermined second threshold, activates A) at least one further secondary antenna module of said two or more secondary antenna modules and/or B) said primary antenna module.

According to further exemplary embodiments, said control unit controls, preferably individually, an electric energy supply to said primary antenna module (and/or to at least one component thereof) and to said at least one secondary antenna module (and/or to at least one component thereof).

Further preferred embodiments relate to a computer program comprising instructions which, when the program is executed by a computer, cause the computer to carry out the method according to according to the embodiments.

Further preferred embodiments relate to a computer-readable storage medium comprising instructions which, when executed by a computer, cause the computer to carry out the method according to the embodiments.

Further preferred embodiments relate to a data carrier signal carrying the computer program according to the embodiments.

Further preferred embodiments relate to a use of the apparatus according to the embodiments and/or of the method according to the embodiments and/or of the computer program according to the embodiments for a) extending a radio range of a mobile radio device, particularly of a terminal for a cellular communications network and/or b) increasing a power efficiency of a mobile radio device, particularly of a terminal for a cellular communications network.

BRIEF DESCRIPTION OF THE FIGURES

Some exemplary embodiments will now be described with reference to the accompanying drawings in which.

DESCRIPTION OF THE EMBODIMENTS

Figure 1:
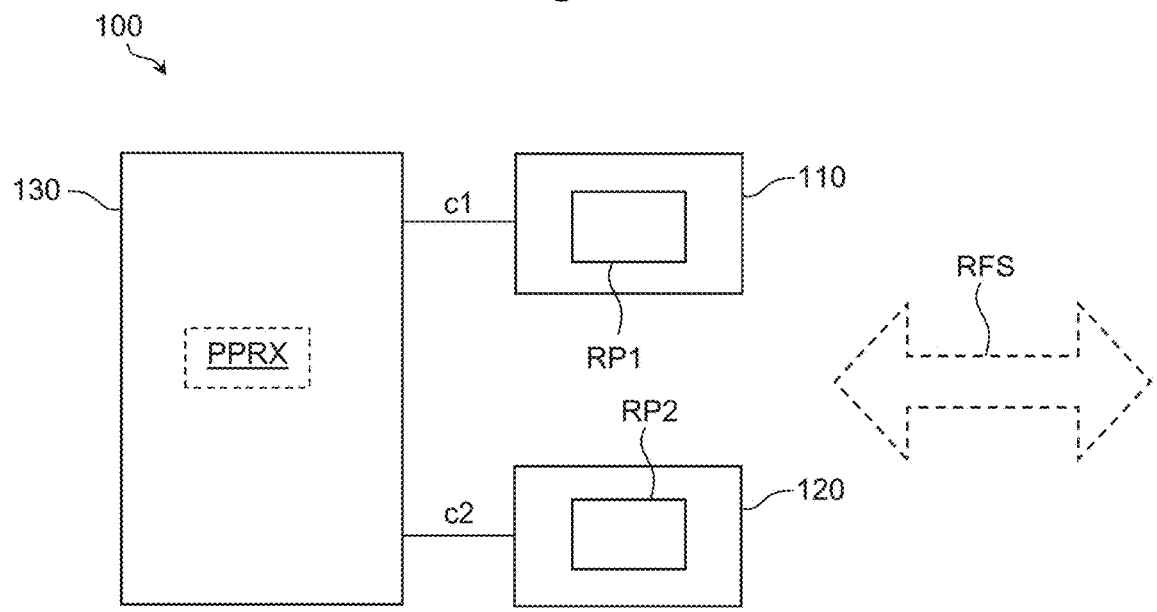
FIG. 1 schematically depicts a simplified block diagram of an apparatus according to exemplary embodiments, FIG. 2 schematically depicts a simplified block diagram of an apparatus according to further exemplary embodiments, FIG. 3 schematically depicts radiation patterns according to further exemplary embodiments, FIG. 4 schematically depicts an antenna array according to further exemplary embodiments, FIG. 5A schematically depicts a simplified block diagram of an apparatus according to further exemplary embodiments, FIG. 5B schematically depicts a simplified block diagram of an apparatus according to further exemplary embodiments, FIG. 6 schematically depicts a simplified block diagram of an mobile radio device according to further exemplary embodiments, FIG. 7 schematically depicts a simplified flow chart of a method according to further exemplary embodiments, FIG. 8A schematically depicts beam patterns according to further exemplary embodiments, FIG. 8B schematically depicts beam patterns according to further exemplary embodiments, FIG. 8C schematically depicts beam patterns according to further exemplary embodiments, FIG. 8D schematically depicts beam patterns according to further exemplary embodiments, FIG. 9A schematically depicts a simplified flow chart of a method according to further exemplary embodiments, FIG. 9B schematically depicts a simplified flow chart of a method according to further exemplary embodiments, FIG. 10 schematically depicts a simplified block diagram of a secondary antenna module according to further exemplary embodiments, FIG. 11A schematically depicts a simplified diagram of an operational scenario according to further exemplary embodiments, FIG. 11B schematically depicts a power over distance diagram related to the exemplary scenario of FIG. 11A, FIG. 11C schematically depicts a power over distance diagram related to the exemplary scenario of FIG. 11A, FIG. 12A schematically depicts a simplified diagram of an operational scenario according to further exemplary embodiments, FIG. 12B schematically depicts a power over distance diagram related to the exemplary scenario of FIG. 12A, FIG. 13A schematically depicts temporal activation patterns for antenna modules according to further exemplary embodiments, FIG. 13B schematically depicts temporal activation patterns for antenna modules according to further exemplary embodiments, and FIG. 14 schematically depicts a simplified block diagram of a control unit according to further exemplary embodiments.

FIG. 1 schematically depicts a simplified block diagram of an apparatus 100 for transmitting and/or receiving radio frequency, RF, signals RFS, according to exemplary embodiments. The apparatus 100 comprises a primary antenna module 110 having a first radiation pattern RP1, at least one secondary antenna module 120 having a second radiation pattern RP2, which is different from said first radiation pattern RP1 of said primary antenna module 110, and a control unit 130 configured to selectively activate and/or deactivate said primary antenna module 110 and/or said at least one secondary antenna module 120. This enables an increased operational flexibility and may, according to further exemplary embodiments, which are explained in detail further below, e.g. be used to extend a radio range and/or improve efficiency, e.g. by at least temporarily reducing an electric power consumption.

According to further exemplary embodiments, said apparatus 100 may e.g. be used for mobile radio device(s) 10 (FIG. 6), e.g. UEs (user equipments) for wireless communications systems 20 (FIG. 11A), particularly cellular communications systems, such as e.g. according to the fifth generation (5G) standard.

According to further exemplary embodiments, said apparatus 100 (FIG. 1) may be configured to transmit and/or receive RF signals RFS in a frequency range above 10 GHz (gigahertz) or above 15 GHz.

According to further exemplary embodiments, said apparatus 100 may be configured to transmit and/or receive RF signals RFS in the frequency range FR2 as defined by the standard 3GPP TS 38.101-2 V15.2.0 (2018-06), cf. e.g. Table 5.1-1 on p. 12.

According to further exemplary embodiments, said selective activation and/or deactivation of said primary antenna module 110 via said control unit 130 may be controlled by means of at least one control signal c1, cf. FIG. 1.

Similarly, according to further exemplary embodiments, said selective activation and/or deactivation of said at least one secondary antenna module 120 via said control unit 130 may be controlled by means of at least one further control signal c2.

Figure 3:
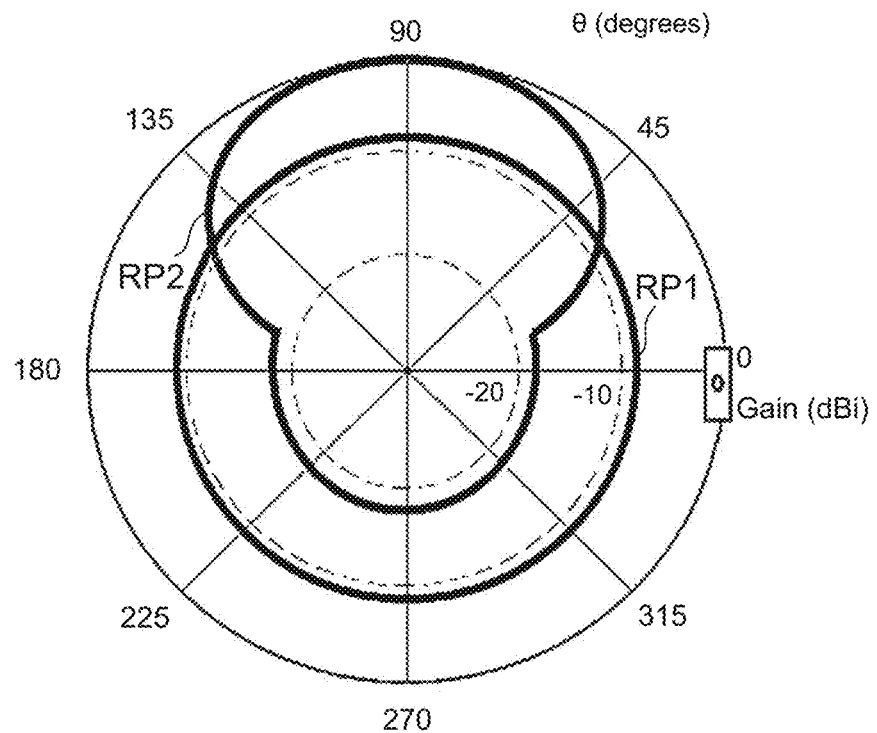

According to further exemplary embodiments, said first radiation pattern RP1 is an omnidirectional radiation pattern, also cf. the exemplary beam pattern diagram of FIG. 3, and said second radiation pattern RP2 is a non-omnidirectional radiation pattern.

As an example, according to further exemplary embodiments, an omnidirectional radiation pattern RP1 is a radiation pattern which is associated with gain levels G between Gmax −3 dB<G<Gmax for at least 70% (percent) of an angular space considered (full sphere or hemi-sphere), wherein Gmax represents the maximum gain of an antenna (module) with such radiation pattern RP1.

As an example, according to further exemplary embodiments, a non-omnidirectional radiation pattern RP2 is a radiation pattern which is associated with gain levels G between Gmax −3 dB<G<Gmax for less than 70% (percent) of an angular space considered (full sphere or hemi-sphere), wherein Gmax represents the maximum gain of an antenna (module) with such radiation pattern, cf. the nonvanishing directivity as depicted by curve RP2 of FIG. 3 exhibiting increased gain values in an angular range between about 45 degrees and 135 degrees. In other words, a main lobe of the second radiation pattern RP2 is centered about 90 degrees in FIG. 3.

According to further exemplary embodiments, said primary antenna module 110 (FIG. 1) comprises a static radiation pattern, which e.g. cannot be changed, particularly cannot be changed dynamically, e.g. during an operation of said apparatus. As an example, said static radiation pattern RP1 may e.g. be determined by design, i.e. providing a specific type of antenna having a specific, fixed beam characteristic.

According to further exemplary embodiments, said primary antenna module 110 comprises a monopole antenna, preferably a quarter-wavelength monopole antenna. According to further exemplary embodiments, said monopole antenna may be arranged on a carrier C (not shown in FIG. 1, cf. FIG. 5A) also carrying at least one further component of said apparatus 100, such as e.g. said at least one further antenna module 120. According to further exemplary embodiments, said carrier C may also comprise a metallized surface portion that may constitute a ground plane (not shown) for said monopole antenna.

According to further exemplary embodiments, said at least one secondary antenna module 120 (FIG. 1) comprises a radiation pattern RP2, which can dynamically be changed, e.g. during an operation of said apparatus 100. As an example, said at least one secondary antenna module 120 may be of the phased-array type.

Figure 4:
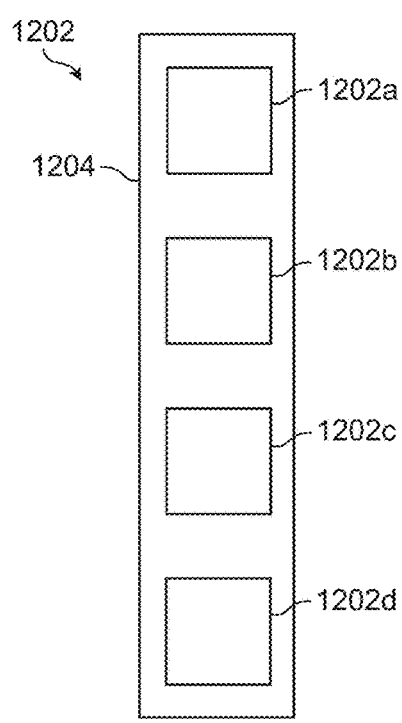

According to further exemplary embodiments, said at least one secondary antenna module 120 comprises at least one linear antenna array 1202, cf. FIG. 4, having two or more (presently for example four) antenna elements 1202a, 1202b, 1202c, 1202d, wherein preferably said two or more antenna elements are patch antenna elements. As an example, said patch antenna elements 1202a, 1202b, 1202c, 1202d may be arranged on a common carrier element 1204 such as a printed circuit board and/or another suitable substrate for carrying said one or more patches 1202a, 1202b, 1202c, 1202d, which may comprise or may be made of electrically conductive material.

According to further exemplary embodiments, said at least one secondary antenna module 120 (FIG. 1) comprises at least one linear dual polarized patch array.

Figure 2:
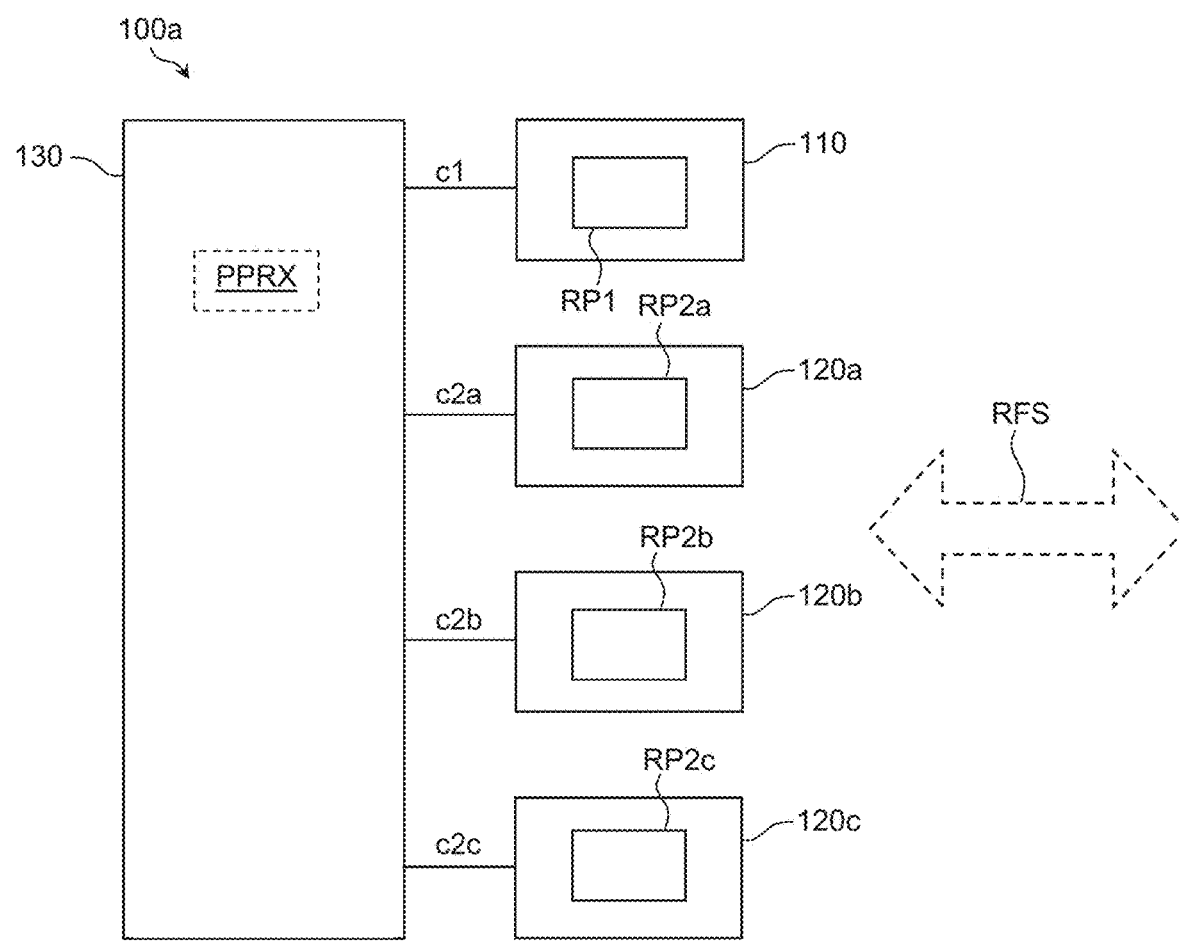

According to further exemplary embodiments, said apparatus comprises two or three secondary antenna modules 120. This is exemplarily depicted by FIG. 2, wherein the apparatus 100a comprises said primary antenna module 110 and three secondary antenna modules 120a, 120b, 120c, each having a respective radiation pattern RP2a, RP2b, RP2c. Preferably, and similar to apparatus 100 of FIG. 1, each of said antenna modules 110, 120a, 120b, 120c of the apparatus 100a of FIG. 2 may be individually activated and/or deactivated by said control unit 130 by a respective control signal c1, c2a, c2b, c2c.

According to further exemplary embodiments, wherein said secondary antenna modules 120a, 120b, 120c may also be denoted as "antenna panels" or "panels", said control unit 130 may also be denoted as "panel control module" (PCM).

According to further exemplary embodiments, preferably if said at least one secondary antenna module 120 (FIG. 1) comprises a plurality of linear (optionally dual polarized) patch arrays, at least two of said linear patch arrays are arranged in parallel to each other or orthogonal to each other. This is exemplarily depicted by FIG. 5A which depicts an apparatus 100b according to further exemplary embodiments. The apparatus 100b comprises one primary antenna module 110, preferably with an omnidirectional radiation pattern RP1 (also cf. FIG. 3), and four secondary antenna modules 120*a*, 120*b*, 120*c*, 120*d*. Preferably, said four secondary antenna modules 120*a*, 120*b*, 120*c*, 120*d* are of the linear patch array type, similar to FIG. 4. The modules 120*a*, 120*d* are arranged horizontally in FIG. 5A, and the modules 120*b*, 120*c* are arranged vertically in FIG. 5A. This way, respective main lobes of the secondary antenna modules 120*a*, 120*b*, 120*c*, 120*d*, also cf. the non-uniform or non-omnidirectional radiation pattern RP2 of FIG. 3, may e.g. point in four different directions of the drawing plane of FIG. 5A.

Figure 5A:
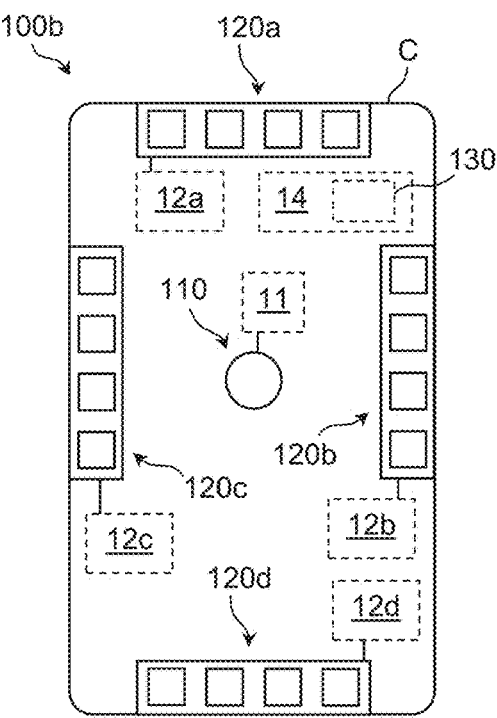

According to further exemplary embodiments, if there is more than one secondary antenna module 120*a*, 120*b*, 120*c*, 120*d*, at least two of said secondary antenna modules 120*a*, 120*b*, 120*c*, 120*d* may comprise similar or identical radiation pattern(s) or characteristic(s), respectively. In the example of FIG. 5A, all four secondary antenna modules 120*a*, 120*b*, 120*c*, 120*d* preferably comprise substantially identical radiation patterns, cf. reference sign RP2 of FIG. 3. Alternatively, one or more of said secondary antenna modules 120*a*, 120*b*, 120*c*, 120*d* may comprise a dynamically controllable radiation pattern.

According to other exemplary embodiments, at least two of said secondary antenna modules may also comprise different radiation pattern(s) or characteristic(s), respectively.

According to further exemplary embodiments, cf. FIG. 5A, said primary antenna module 110 and said secondary antenna modules 120*a*, 120*b*, 120*c*, 120*d* are arranged on and/or attached to a common carrier element C. According to further exemplary embodiments, said common carrier element C may comprise or represent a printed circuit board.

Optionally, according to further exemplary embodiments, at least one radio module 11, 12*a*, 12*b*, 12*c*, 12*d* may be provided and assigned to a respective antenna modules.

As an example, as is well known in the art, such radio module may be represented by an integrated circuit comprising at least one of the following elements, e.g. for a transmit chain: a) digital interface, e.g. for exchanging data with a baseband processing unit, BBU, 14 configured to perform baseband signal processing for said apparatus 100*b*, b) digital to analog converter, e.g. for converting transmit data to be transmitted in form of an analog RF signal RFS by means of at least one antenna module 110, 120*a*, 120*b*, 120*c*, 120*d* from the digital domain (e.g., as received via said digital interface from the BBU 14) to the analog domain, c) filter for filtering signals processed by said radio module, d) (preferably automatic) gain control stage, e) upconverter (e.g., comprising a mixer stage), e.g. for upconverting analog signals to an intermediate frequency, IF, range, f) amplifier, e.g. for amplifying analog signals in said IF range, g) diplexer or quadplexer or the like to combine several analog IF signals into one output signal, e.g. for supplying at least one of said antenna modules 110, 120*a*, 120*b*, 120*c*, 120*d* with at least one of said analog IF signals, h) analog interface, e.g. for connection to at least one of said antenna modules 110, 120*a*, 120*b*, 120*c*, 120*d*, e.g. by means of at least one coaxial cable.

Similar elements may also be used to provide at least one receive chain in such radio module. Additionally, the radio module may comprise at least one analog to digital converter for transforming analog signals e.g. derived from analog IF signals as received from at least one of said antenna modules 110, 120*a*, 120*b*, 120*c*, 120*d* in a receive direction (e.g., after amplification and/or downconversion from the IF range to e.g. a baseband range and/or filtering), into the digital domain, e.g. for forwarding to the BBU 14 via said digital interface.

According to further exemplary embodiments, the BBU 14 and the radio units 11, 12*a*, 12*b*, 12*c*, 12*d* may also be arranged on said carrier element C (FIG. 5A). According to further exemplary embodiments, the control unit 130 or a corresponding functionality may also be integrated into said BBU 14.

Figure 5B:
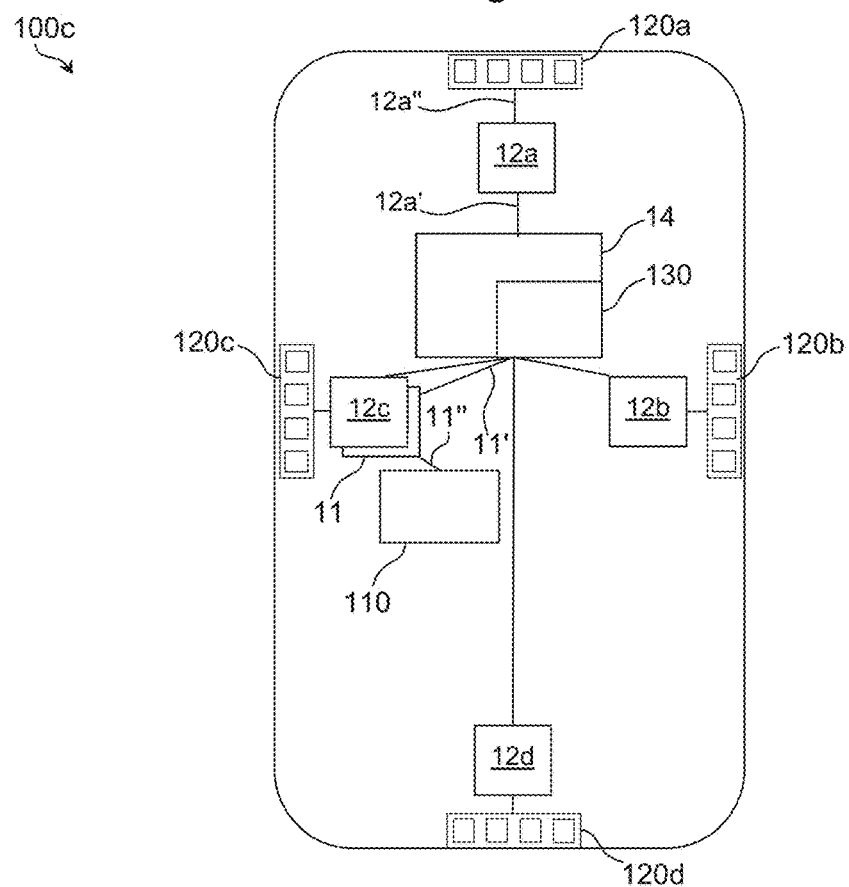

FIG. 5B schematically depicts a simplified block diagram of an apparatus 100*c*, which is similar to the embodiment 100*b* of FIG. 5A. However, FIG. 5B additionally depicts details related to the connection of the various elements 11, 12*a*, 12*b*, 12*c*, 12*d*, 14, 110, 120*a*, 120*b*, 120*c*, 120*d*.

As an example, according to further exemplary embodiments, the radio unit 11, which is assigned to the primary antenna module 110, is connected via a first connection 11' to the BBU 14 and is connected via a second connection 11" to the primary antenna module 110.

According to further exemplary embodiments, said first connection 11' may comprise a digital bus implementing the abovementioned digital interface for exchanging digital data with said baseband processing unit, BBU, 14.

According to further exemplary embodiments, said first connection 11' may comprise one or more (preferably dedicated) control lines and/or one or more lines for electrical energy supply of said radio unit 11 by means of said BBU 14 and/or the control unit 130, which may be integrated into said BBU 14. This way, the control unit 130 may e.g. selectively activate or deactivate the radio unit 11, i.e. by activating or deactivating the electrical energy supply to said radio unit 11 via said first connection 11'.

According to further exemplary embodiments, said second connection 11" may comprise an analog interface such as e.g. at least one coaxial cable, e.g. for transmitting IF range analog signals from the radio unit 11 to the primary antenna module 110 and/or for receiving IF range analog signals from the primary antenna module 110 to the radio unit 11.

According to further exemplary embodiments, said second connection 11" may comprise one or more (preferably dedicated) control lines and/or one or more lines for electrical energy supply of said primary antenna module 110 by means of said radio unit 11 and/or the control unit 130, which may be integrated into said BBU 14, as mentioned above. This way, the control unit 130 may e.g. selectively activate or deactivate the primary antenna module 110 (and/or the radio unit 11, as mentioned above), i.e. by activating or deactivating the electrical energy supply to said radio unit 11 via said first connection 11' and/or the electrical energy supply from said radio unit 11 to said primary antenna module 110 via said second connection 11".

As an example, according to further exemplary embodiments, the radio unit 12*a*, which is assigned to the first secondary antenna module 120*a*, is connected via a first connection 12*a*' to the BBU 14 and is connected via a second connection 12*a*" to the first secondary antenna module 120*a*.

According to further exemplary embodiments, said first connection 12*a*' may comprise a digital bus implementing the abovementioned digital interface for exchanging digital data with said baseband processing unit, BBU, 14.

According to further exemplary embodiments, said first connection 12*a*' may comprise one or more (preferably dedicated) control lines and/or one or more lines for electrical energy supply of said radio unit 12*a* by means of said BBU 14 and/or the control unit 130. This way, the control unit 130 may e.g. selectively activate or deactivate the radio unit 12a, i.e. by activating or deactivating the electrical energy supply to said radio unit 12a via said first connection 12a'.

According to further exemplary embodiments, said second connection 12a" may comprise an analog interface such as e.g. at least one coaxial cable, e.g. for transmitting IF range analog signals from the radio unit 12a to the first secondary antenna module 120a and/or for receiving IF range analog signals from the first secondary antenna module 120a to the radio unit 12a.

According to further exemplary embodiments, said second connection 12a" may comprise one or more (preferably dedicated) control lines and/or one or more lines for electrical energy supply of said first secondary antenna module 120a by means of said radio unit 12a and/or the control unit 130. This way, the control unit 130 may e.g. selectively activate or deactivate the first secondary antenna module 120a (and/or its assigned radio unit 12a, as mentioned above), i.e. by activating or deactivating the electrical energy supply to said radio unit 12a via said first connection 12a' and/or the electrical energy supply from said radio unit 12a to said first secondary antenna module 120a via said second connection 12a".

According to further exemplary embodiments, at least one of said further radio units 12b, 12c, 12d, preferably all of said further radio units 12b, 12c, 12d, may comprise respective first connections to the BBU 14, which may be similar or identical to the first connection 12a' of said radio unit 12a.

According to further exemplary embodiments, at least one of said further radio units 12b, 12c, 12d, preferably all of said further radio units 12b, 12c, 12d, may comprise respective second connections to their respectively assigned secondary antenna module 120b, 120c, 120d, which may be similar or identical to the second connection 12a" of said radio unit 12a.

This way, according to further exemplary embodiments, the control unit 130 may individually activate and/or deactivate at least one of the components 11, 12a, 12b, 12c, 12d, 110, 120a, 120b, 120c, 120d.

Figure 6:
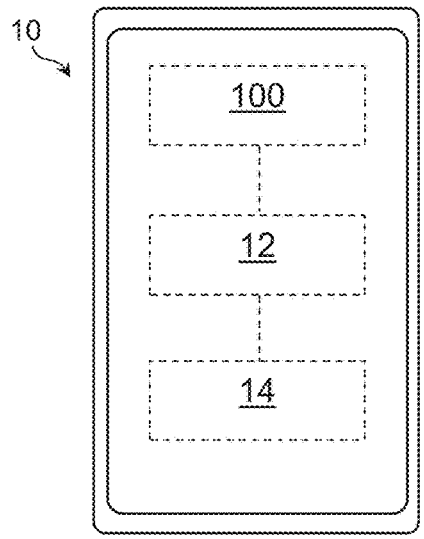

FIG. 6 schematically depicts a mobile radio device 10 for a wireless communications system, particularly a cellular communications system, comprising at least one apparatus 100 according to the embodiments. As an example, said mobile radio device 10 may be a user equipment, UE, e.g. for a 5G communications system. Said UE 10 may e.g. also comprise a BBU 14 and/or at least one radio unit 12 as explained above with reference to FIG. 5A, 5B.

According to further exemplary embodiments, said radio device 10 is configured to at least temporarily operate according to the standard 3GPP TS 38.331, V15.4.0, 2018-12, and to at least temporarily use at least said primary antenna module 110 (FIG. 1) for a target cell search depending on synchronization signal blocks, SSB, according to the standard 3GPP TS 38.331, V15.4.0, 2018-12. This enables to attain low latency for a target cell search, as compared e.g. to a time division multiplexed (TDM) operation of two or more secondary antenna modules.

Further exemplary embodiments relate to a method of operating a mobile radio device 10 for a wireless communications system, particularly a cellular communications system, comprising at least one apparatus according to the embodiments. Further details related to exemplary embodiments of said method are explained in the following with reference to FIG. 7 et seq.

Figure 7:
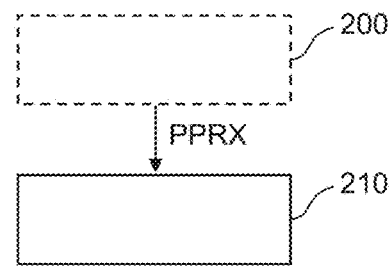

According to further exemplary embodiments, cf. FIG. 7, said control unit 130 is configured to determine 200 at least one of the following received power parameters PPRX: a) a received power of a received RF signal RFS (FIG. 1) associated with said primary antenna module 110 (e.g., an RF signal that has been (or is being) received via said primary antenna module 110), b) a received power of a received RF signal RFS associated with said at least one secondary antenna module 120 (e.g., an RF signal that has been (or is being) received via said at least one secondary antenna module 120), and to selectively activate 210 and/or deactivate 210 said primary antenna module 110 and/or said at least one secondary antenna module 120 depending on at least one of said received power parameters PPRX. This e.g. enables to at least temporarily activate such antennas or antenna module(s), which are associated with a comparatively great receive power level, while other antennas or antenna module(s) may at least temporarily be deactivated.

According to further exemplary embodiments, said control unit 130 (FIG. 1) is configured to selectively activate and/or deactivate at least one component of said primary antenna module 110 and/or at least one component of said at least one secondary antenna module 120, 120a, 120b, 120c, 120d depending on at least one of said received power parameters PPRX. This e.g. enables to at least temporarily deactivate one or more components, preferably active components (which dissipate electrical energy when activated) of such antennas or antenna module(s), which are associated with a comparatively small receive power level, while other antennas or antenna module(s) may at least temporarily be activated.

According to further exemplary embodiments, said control unit 130 (FIG. 1) is configured to selectively activate and/or deactivate at least one component 11, 12a, 12b, 12c, 12d assigned to at least one of said antenna modules 110, 120, 120a, 120b, 120c, 120d, preferably together with an activation and/or deactivation of the respective antenna module 110, 120, 120a, 120b, 120c, 120d.

Figure 10:
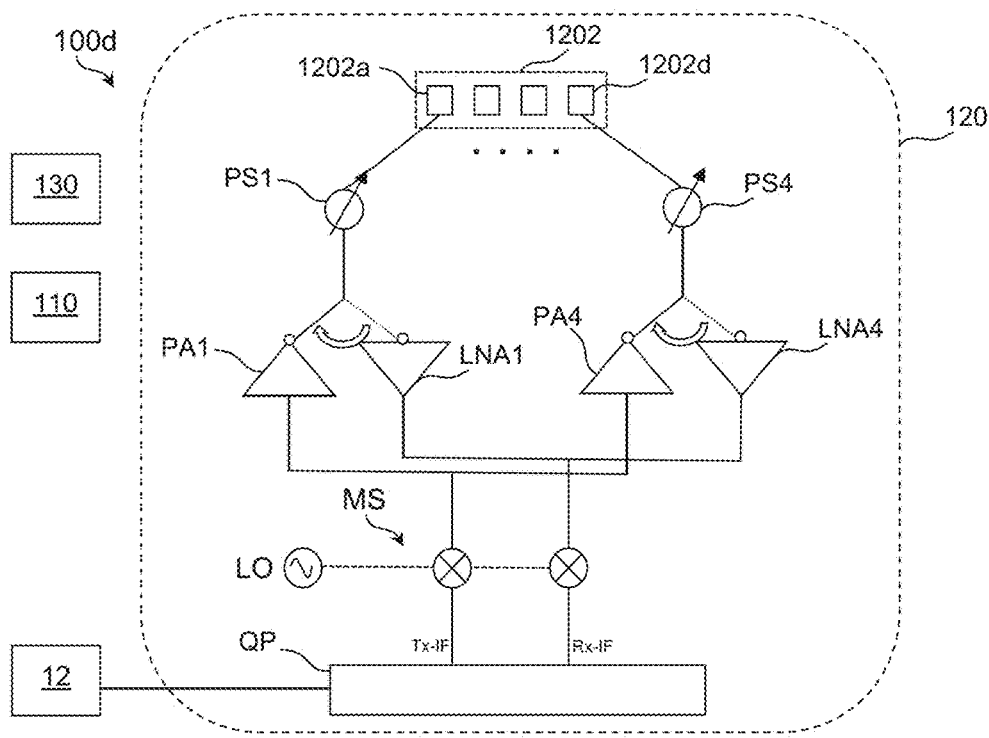

According to further exemplary embodiments, said at least one secondary antenna module 120 may e.g. comprise at least one of the following elements, also cf. FIG. 10 which schematically depicts a simplified block diagram of aspects of said secondary antenna module 120 in the context of an apparatus 100d: (preferably analog) phase shifter PS1, . . . , PS4, power amplifier (PA) PA1, . . . , PA4, low noise amplifier (LNA) LNA1, . . . , LNA4.

According to further exemplary embodiments, said at least one secondary antenna module 120 may e.g. comprise a mixer stage MS with a local oscillator LO, e.g. for upconverting IF range input signals Tx-IF (as e.g. obtained by a radio unit 12 assigned to said to said secondary antenna module 120) to a desired target RF range, wherein said desired target RF range e.g. lies within the FR2 range of the 5G standard, as explained above.

According to further exemplary embodiments, said IF range input signals Tx-IF may be obtained from a quadplexer QP receiving an analog IF signal from the radio unit 12.

Said at least one secondary antenna module 120 of FIG. 10 comprises a linear antenna array 1202 as explained above with respect to FIG. 4, i.e. comprising four individual antenna elements 1202a, . . . , 1202d. To provide an input signal to the first antenna element 1202a, the mixer stage MS of the secondary antenna module 120 of FIG. 10 upconverts said IF range input signal Tx-IF, amplifies it by means of a first power amplifier PA1, (optionally) applies a phase shift to the so amplified signal by means of a first phase shifter PS1, and provides said optionally phase-shifted signal to the first antenna element 1202a.

Similar processing in the transmit direction is performed by the further three Tx (transmit) branches of the secondary antenna module 120 only the fourth of which is designated with reference signs PA4, PS4 in FIG. 10 for reasons of clarity.

According to further exemplary embodiments, said phase shifters PS1, . . . , PS4 are bidirectional phase shifters.

According to further exemplary embodiments, a corresponding receive branch of the secondary antenna module 120, e.g. associated with the first antenna element 1202a, may comprise said first phase shifter PS1, a first LNA LNA1, the mixer stage MS, and the quadplexer. The further three receive branches comprise a similar structure and function, together providing, at an output of the mixer stage MS, i.e. after downconversion, a receive signal Rx-IF in an IF range (i.e., downconverted from an RF range e.g. in the FR2 range of the 5G standard).

As can be seen from FIG. 10, said secondary antenna module 120 comprises a plurality of active devices, e.g. PA1, . . . , PA4, LNA1, . . . , LNA4, LO, so that substantial savings of electrical energy may be obtained when at least temporarily deactivating said secondary antenna module 120 according to exemplary embodiments. For apparatus 100a, 100b, 100c with a plurality of secondary antenna modules, this applies correspondingly.

According to further exemplary embodiments, when deactivating/activating said at least one secondary antenna module 120 by means of said control unit 130, at least one of said phase shifter(s) and/or PA and/or LNA may be deactivated/activated. According to further exemplary embodiments, as mentioned above, activating/deactivating may be performed by activating/deactivating an electrical energy supply of (e.g., a direct current supply voltage for) at least one of said elements.

FIG. 8A to 8D schematically depict different beam patterns according to further exemplary embodiments, together with a schematic depiction of the apparatus 100b of FIG. 5A, wherein only those antenna modules are depicted which are currently activated.

Figure 8A:
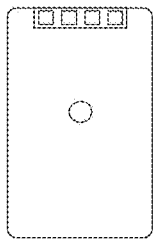

As an example, in FIG. 8A, the primary antenna module 110 (also cf. FIG. 5A) is activated, resulting in the first (omnidirectional) radiation pattern RP1 of FIG. 8A. A second radiation pattern RP2a' is attained by activation of (only) the first secondary antenna module 120a (also cf. FIG. 5A). In other words, the second radiation pattern RP2a' of FIG. 8A corresponds with the radiation pattern RP2a (FIG. 2) of the first secondary antenna module 120a.

Figure 8B:
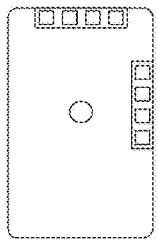
Figure 8C:
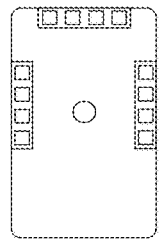
Figure 8D:
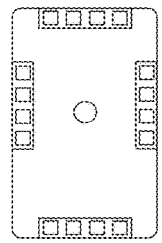
Figure 8D:
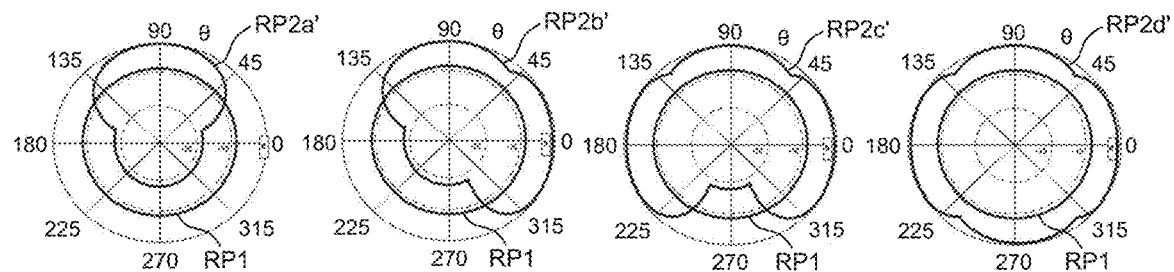

As a further example, in FIG. 8B, the primary antenna module 110 (also cf. FIG. 5A) is activated, resulting in the first radiation pattern RP1 of FIG. 8B. A second radiation pattern RP2b' is attained by activation of the first secondary antenna module 120a and the second secondary antenna module 120b (also cf. FIG. 5A). Thus, the second radiation pattern RP2b' of FIG. 8B corresponds with a superposition of the individual radiation patterns RP2a, RP2b (FIG. 2) of the first and second secondary antenna modules 120a, 120b. Similar observations apply to the further FIGS. 8C, 8D, wherein the radiation pattern RP2c' of FIG. 8C is attained by simultaneously activating three secondary antenna modules 120a, 120b, 120c, and wherein the radiation pattern RP2d' of FIG. 8D is attained by simultaneously activating all four secondary antenna modules 120a, 120b, 120c, 120d of the apparatus 100b.

Figure 9A:
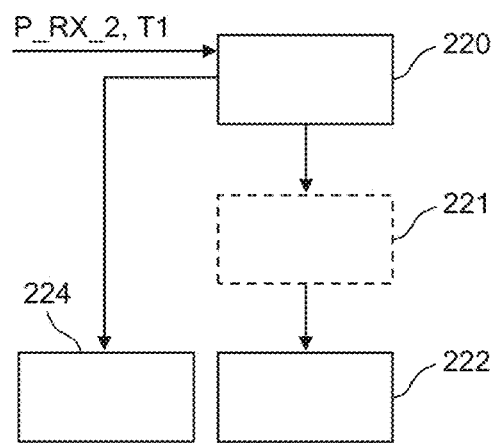

According to further exemplary embodiments, cf. FIG. 9A, said control unit 130 (FIG. 1) is configured to: determine 220 whether said received power P_RX_2 of a received RF signal RFS associated with said at least one secondary antenna module 120 is less than or equal to a predetermined first threshold T1, and, if said received power P_RX_2 of said received RF signal associated with said at least one secondary antenna module 120 is less than or equal to said predetermined first threshold T1, activate 222 said primary antenna module 110, wherein preferably, said control unit 130 is configured to, if said received power P_RX_2 of said received RF signal associated with said at least one secondary antenna module 120 is greater than said predetermined first threshold T1, deactivate 224 said primary antenna module.

According to further exemplary embodiments, said control unit 130 may be configured to determine 221 (FIG. 9A) whether said primary antenna module 110 is currently activated, prior to deactivating it, cf. step 222.

Figure 9B:
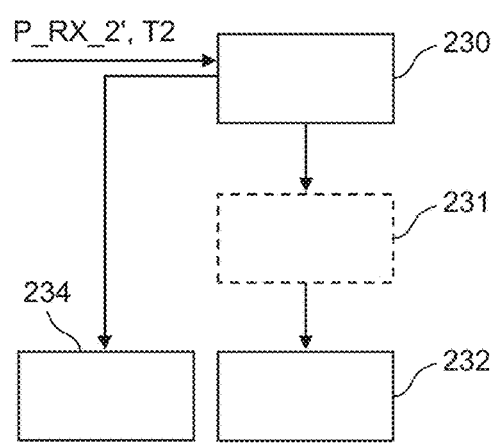

According to further exemplary embodiments, said apparatus comprises two or more secondary antenna modules 120a, 120b (cf. e.g. apparatus 100a of FIG. 2), wherein said control unit 130 is configured to, cf. the flow chart of FIG. 9B: determine 230 whether a received power P_RX_2' of a received RF signal RFS associated with one of said secondary antenna modules 120a is greater than a predetermined second threshold T2, and, if said received power P_RX_2' of said received RF signal RFS associated with said one of said secondary antenna modules 120a is greater than said predetermined second threshold T2, deactivate 232 a) at least one further secondary antenna module 120b of said two or more secondary antenna modules (preferably all further secondary antenna modules) and/or b) said primary antenna module 110, wherein preferably, said control unit 130 (FIG. 2) is configured to, if said received power P_RX_2' of said received RF signal associated with said one of said secondary antenna modules is less than or equal to said predetermined second threshold T2, activate 234 A) at least one further secondary antenna module 120b of said two or more secondary antenna modules and/or B) said primary antenna module 110.

According to further exemplary embodiments, said control unit 130 may be configured to determine 231 whether at least one further secondary antenna module 120b of said two or more secondary antenna modules and/or B) said primary antenna module 110 is active, prior to deactivating 232 it.

According to further exemplary embodiments, said control unit 130 is further configured to, e.g. after—or at the end of—step 234, determine a received power of a received RF signal associated with said at least one further secondary antenna module 120b of said two or more secondary antenna modules, determine a received power of a received RF signal associated with said primary antenna module 110, to compare said received power of said received RF signal associated with said at least one further secondary antenna module 120b with said received power of said received RF signal associated with said primary antenna module 110, and, optionally, to deactivate at least one of said at least one further secondary antenna module and said primary antenna module. This way, the "better" one—in terms of receive power level—of said at least one further secondary antenna module 120b and said primary antenna module 110 may be kept activated, while the other one(s) may be deactivated again for energy efficiency.

According to further exemplary embodiments, as already mentioned above, said control unit 130 (FIG. 1) is configured to control an electric energy supply to said primary antenna module 110 and to said at least one secondary antenna module 120, 120a, 120b, 120c, 120d.

Preferably, said control unit 130 is configured to individually activate and deactivate an electric energy supply to said primary antenna module 110 (or at least one component thereof) and to said at least one secondary antenna module 120, 120a, 120b, 120c, 120d (or at least one component thereof, also cf. FIG. 10 as explained above).

Further exemplary embodiments relate to a method of operating an apparatus according to the embodiments, as e.g. explained above with reference to the flow charts of FIG. 7, 9A, 9B.

Figure 11A:
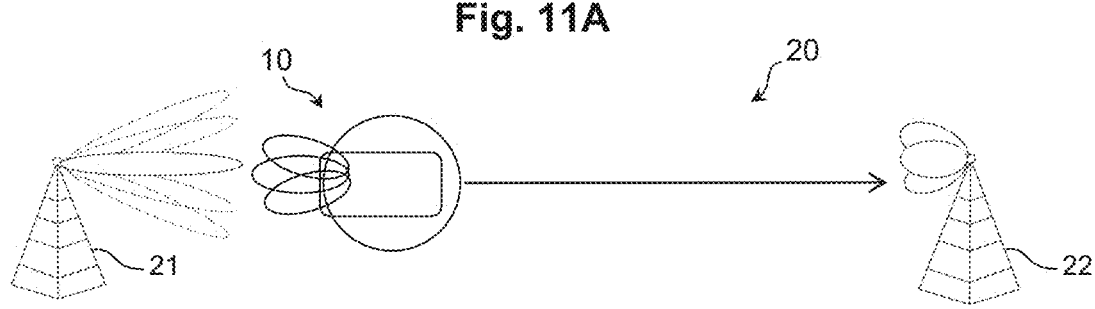

FIG. 11A schematically depicts a simplified diagram of an operational scenario according to further exemplary embodiments. Depicted is a cellular communications system 20, e.g. operating according to the 5G standard or configured to at least temporarily operate according to the 5G standard, for example using RF signals in the frequency range FR2 as defined by the standard 3GPP TS 38.101-2 V15.2.0 (2018-06), cf. e.g. Table 5.1-1 on p. 12. The system 20 comprises a first base station 21, e.g. a gNB in the sense of 3GPP TS 38.300 V15.6.0 (2019-06), section 4.1. Similarly, element 22 may be a second base station, e.g. gNB, and a UE 10 according to the embodiments (also cf. FIG. 6) moving between said gNBs 21, 22.

Figure 11B:
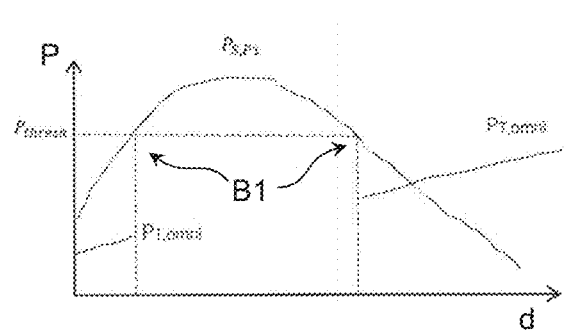
Figure 11C:
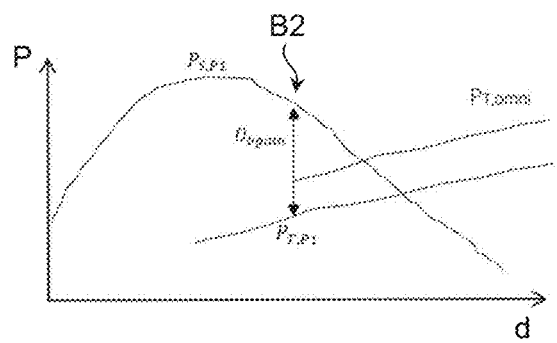

FIGS. 11B and 11C each schematically depict a power P over distance d diagram related to the exemplary scenario of FIG. 11A. According to further exemplary embodiments, an "intelligent" switching mechanism for when to power on (i.e., activate) and off (i.e., deactivate) the primary antenna module 110 (e.g., comprising an omnidirectional antenna or generally an omnidirectional radiation pattern RB1 (FIG. 3)) is provided.

As an example, according to further embodiments, the primary antenna module 110 with its omnidirectional radiation pattern RB1 may be switched on (i.e., activated), if a benefit can be achieved from a coverage perspective related to the 5G system 20 of FIG. 11A under 2 conditions:

Condition 1: When the received power $P_{S,P1}$ of a first secondary antenna module 120a (FIG. 2) connected to the serving cell established by gNB 21 (FIG. 11A) falls below a threshold $P_{thresh}$, the primary antenna module 110 may be active and may be switched on, $P_{S,P1} < P_{thresh}$. This aspect of the exemplary embodiment can be interpreted in the following way: if the radio conditions perceived by the first secondary antenna module 120a with the serving cell of gNB 21 are good (e.g., $P_{S,P1} >= P_{thresh}$), there is no need to activate the primary antenna module 110. Otherwise, it may be activated which may improve the radio conditions.

As an example, said Condition 1 is fulfilled at the points denoted with reference sign B1 of FIG. 11B. The further curve $P_{T,omni}$ of FIG. 11B denotes a received power of a potential handover target cell as received by the primary antenna module 110.

Condition 2: When the power of any target (e.g., other gNB 22, that may potentially be a target for a handover (HO) procedure) detected by the first secondary antenna module 120a (FIG. 2), which is currently connected to the serving cell established by gNB 21, plus Offset ($P_{T,P1}+O_{bgain}$) is above the Power ($P_{S,P1}$) of the serving cell, then the primary antenna module 110 should be active and switched on: $P_{T,P1}+O_{bgain} < P_{S,P1}$. This aspect of the exemplary embodiment can be interpreted in the following way: as soon as the first secondary antenna module 120a connected to serving cell (gNB 21) detects an additional target cell (of gNB 22), then activate the primary antenna module 110 with its omnidirectional radiation pattern RP1 as it is likely that it may boost the power of the target cell (gNB 22) and may potentially lead to an earlier handover from gNB 21 to gNB 22 and may thus effect a better mobility and throughput performance. Said Condition 2 is e.g. fulfilled at the point denoted with reference sign B2 of FIG. 11C.

Figure 12A:
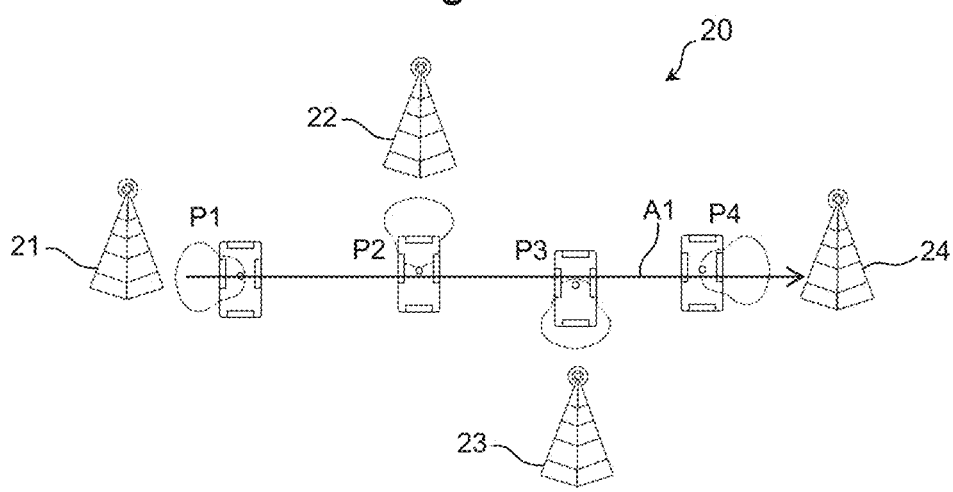
Figure 12B:
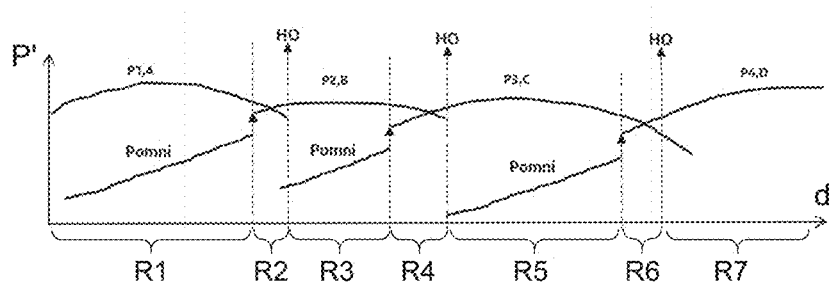

FIG. 12A schematically depicts a simplified diagram of an operational scenario according to further exemplary embodiments, and FIG. 12B schematically depicts a power P' over distance d diagram related to the exemplary scenario of FIG. 12A.

Depicted is a cellular communications system 20, e.g. operating according to the 5G standard or configured to at least temporarily operate according to the 5G standard, for example using RF signals in the frequency range FR2 as defined by the standard 3GPP TS 38.101-2 V15.2.0 (2018-06), cf. e.g. Table 5.1-1 on p. 12. The system 20 comprises a first gNB 21, a second gNB 22, a third gNB 23, and a fourth gNB 24. FIG. 12A also shows a UE according to the embodiments (also cf. FIG. 6) moving between said gNBs 21, 22, 23, 24, cf. arrow A1. More specifically, four different operational states of the UE are depicted by FIG. 12A, which are denoted with reference signs P1, P2, P3, P4. As an example, in the state "P1", the secondary antenna module 120c (also cf. FIG. 5A) pointing to the left, e.g. towards the gNB 21, is activated, in the state "P2" (in which the UE has moved further to the right of FIG. 12A, e.g. towards the fourth gNB 24), the secondary antenna module 120a (FIG. 5A) pointing vertically upwards in FIG. 12A, e.g. towards the gNB 22, is activated, in the state "P3" (in which the UE has moved further towards the fourth gNB 24), the secondary antenna module 120d (FIG. 5A) pointing vertically downwards in FIG. 12A, e.g. towards the gNB 23, is activated, and in the state "P4" (in which the UE has arrived at or is close to the fourth gNB 24), the secondary antenna module 120b (FIG. 5A) pointing to the right in FIG. 12A, e.g. towards the fourth gNB 24, is activated.

According to further exemplary embodiments, a power saving algorithm may be used which will be explained below with reference to FIG. 12A, 12B.

According to further exemplary embodiments, the primary antenna module 110 with its omnidirectional radiation pattern RP1 (FIG. 3) may be switched on if a benefit can be achieved from a power saving perspective under at least one of the following aspects:

Aspect 1: power saving phase. When the receive signal strength of a currently active secondary antenna module connected to a serving cell ($P_{act,serv}$) is above a given threshold ($P_{thresh}$), then only said primary antenna module 110 may be used for a target cell discovery: $P_{act,serv} > P_{thresh}$.

According to further exemplary embodiments, said threshold $P_{thresh}$ may represent a level at which the UE 10 is in good radio conditions and thus e.g. with no urgency to perform a handover. The primary antenna module 110 with an omnidirectional radiation pattern RP1 may thus be a comparatively power efficient way to discover new cells.

Aspect 2: fast target cell discovery using said at least one secondary antenna module 120, 120a, 120b, . . . . When the signal strength Pam, measured by the primary antenna module 110 of one of the target cells is getting "close" to a receive power $P_{act,serv}$ of an active secondary antenna module connected to the serving cell, within an offset value $P_{offset}$, then all secondary antenna modules may be activated for a fast target cell discovery (either simultaneously or time multiplexed).

Post Aspect 2: Once Aspect 2 is passed, then a handover or conditional handover may be executed, if for example an "A3"-event is triggered by the UE to the network 20.

FIG. 12B exemplarily depicts receive power levels $P_{1,A}$, $P_{2,B}$, $P_{3,C}$, $P_{4,D}$ as may be determined by said UE of FIG. 12A along its way A1 of movement from gNB 21 to gNB 24, passing the further gNBs 22, 23, wherein level $P_{1,4}$ is associated with state P1 of FIG. 12A, $P_{2,8}$ is associated with state P2 of FIG. 12A, and so on. Also, a receive power level $P_{omni}$ as may be determined by the primary antenna module 110 is depicted.

According to further exemplary embodiments, in a first distance range R1, the UE performs target cell search using (preferably only) the primary antenna module 110, e.g. in accordance with Aspect 1 mentioned above. In a second distance range R2, all secondary antenna modules 120 may be activated, in a third distance range R3 the UE performs target cell search again using (preferably only) the primary antenna module 110, and the process is continued similarly for the further gNB 23, 24 of FIG. 12A within the further distance ranges R4, R5, R6, R7 of FIG. 12B.

Handover procedures are denoted with reference sign HO in FIG. 12B.

Figures 13A, 13B, 14:
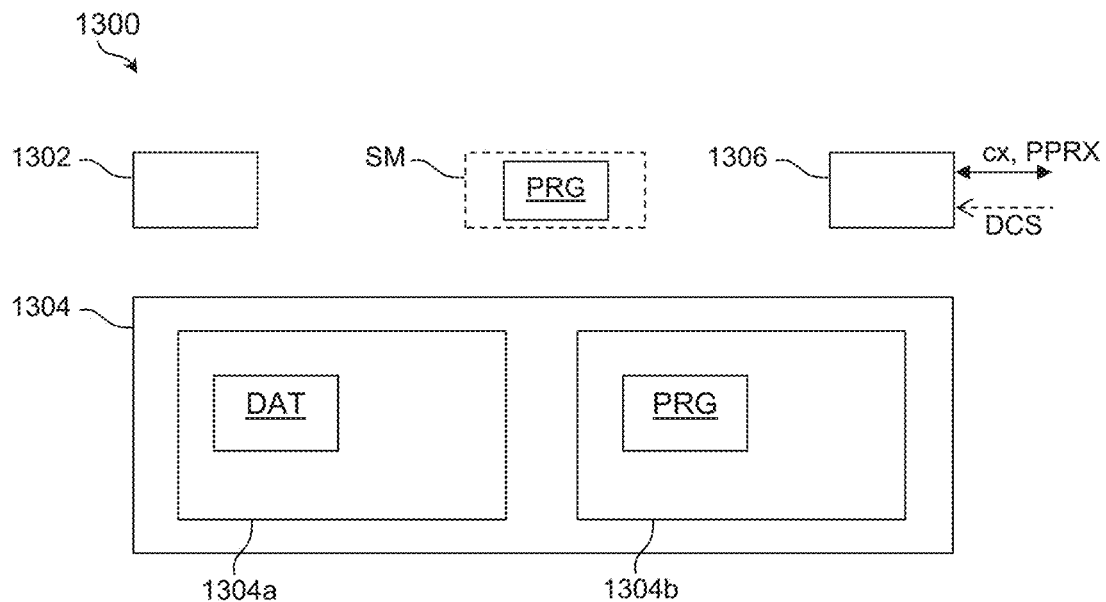

FIGS. 13A and 13B each schematically depict temporal activation patterns for antenna modules 110, 120a, 120b, 120c, 120d of the apparatus according to further exemplary embodiments.

In the table of FIG. 13A, line L1 corresponds with the first secondary antenna module 120a (FIG. 5A), line L2 corresponds with the second secondary antenna module 120b (FIG. 5A), line L3 corresponds with the third secondary antenna module 120c (FIG. 5A), line L4 corresponds with the fourth secondary antenna module 120d (FIG. 5A), and line L5 corresponds with the primary antenna module 110 (FIG. 5A), wherein the columns col1, col2, . . . , col14 denote discrete time steps of said antenna module activation pattern, and wherein a letter "X" in a certain cell defined by a specific line and a specific column denotes that the respective antenna module is activated in the time step denoted by the specific column. As an example, from FIG. 13A it can be seen, that the primary antenna module 110 (cf. line L5) is permanently activated in all time steps col1, col2, . . . , col14, wherein the individual secondary antenna modules 120a, 120b, 120c, 120d are periodically activated in a time-multiplexed manner. In other words, according to further preferred embodiments, in a single discrete time step, only two antenna modules are active, namely the primary antenna module 110 and one of the four secondary antenna modules.

According to further exemplary embodiments, the activation pattern of FIG. 13A may e.g. be used in an idle mode of the UE (FIG. 6), wherein a target cell search may be performed.

According to further exemplary embodiments, the activation pattern of FIG. 13B may e.g. be used in a connected mode of the UE (FIG. 6), wherein the UE is connected via a first secondary antenna module 120a (FIG. 5A) to a gNB, wherein a target cell search may be performed e.g. using further three secondary antenna modules 120b, 120c, 120d (lines L2, L3, L4) in a time-multiplexed manner and the primary antenna module 110 (line L5) in a continuous manner.

Similar patterns as those exemplarily disclosed above with reference to FIG. 13A, 13B for individual antenna modules 110, 120a, 120b, 120c, 120d may, according to further exemplary embodiments, also be applied to individual antenna elements (e.g., patches) of e.g. a (linear) array antenna 1202 (FIG. 4). As an example, the various antenna elements 1202a, 1202b, 1202c, 1202d of an array antenna 1202 may be periodically activated in a time-multiplexed manner. Activation and/or deactivation of said individual antenna elements may e.g. be performed by appropriately supplying or not supplying the respective components of an receive and/or transmit branch associated with the respective antenna element, cf. the above explanations with reference to FIG. 10.

According to further exemplary embodiments, one reason for at least temporarily deactivating at least one antenna module according to the embodiments is that it is not efficient to have a large amount of RF components (e.g. of the tx and/or rx branches of the antenna modules) switched on, unless it is necessary. When considering a few potential scenarios according to further exemplary embodiments, the potential benefits of temporarily deactivating one or more antenna modules may e.g. vary from a factor of 1 to 16 of power saving, based on the exemplary configuration of the apparatus 100b of FIG. 5A. For example, in an exemplary scenario of 4 patches 1202a, . . . , 1202d (FIG. 4) per antenna module a factor of 4 times a number of antenna modules of power saving may be obtained when the primary antenna module 110 is used instead of the secondary antenna modules 120a, 120b, 120c, 120d.

According to further exemplary embodiments, the primary antenna module 110 (FIG. 1) may comprise an own transmitter and/or receiver chain, cf. e.g. the radio unit 11 of FIG. 5B.

According to further exemplary embodiments, the primary antenna module 110 (FIG. 1) may share a transmitter and/or receiver chain with said at least one secondary antenna module 120 (FIG. 1). In this configuration, an activation and/or deactivation of the components 110, 120 may be attained by the control signal(s) c1, c2 provided by said control unit 130.

Advantageously, according to further exemplary embodiments, a primary antenna module 110 with an omnidirectional beam pattern RP1 is less complex and less costly as a linear array type antenna, as e.g. device 1202 of FIG. 4.

Nevertheless, providing said primary antenna module 110 in addition to said at least one secondary antenna module 120 enables to flexibly and efficiently adapt an overall beam characteristic of said apparatus to different operational states. As an example, in some operational states, the primary antenna module 110 may e.g. attain up to 10-15 dB of antenna gain via its omnidirectional antenna as compared to a secondary antenna module 120 in the "dead zone" angles, e.g. which secondary antenna module 120 is currently not aligned with its radiation pattern RP2 (FIG. 3), e.g. with its main lobe of said radiation pattern RP2, to another communication device such as e.g. a serving gNB.

According to further exemplary embodiments, at least one of the following algorithms may be used with the apparatus according to the embodiments: a) range/coverage extension algorithm by enabling the primary antenna module 110 when it has better coverage than said secondary antenna module 120. This algorithm may e.g. be used with UEs 10 with less or equal than 3 secondary antenna modules 120a, 120b, 120c. b) a power saving algorithm that may e.g. deactivate one or more secondary antenna modules when the primary antenna module 110 is good enough. This may e.g. happen in good radio conditions.

FIG. 14 schematically depicts a simplified block diagram of a control unit 1300 according to further exemplary embodiments. As an example, the control unit 130 as explained above may comprise a structure and/or configuration similar or identical to the control unit 1300 of FIG. 14.

The control unit 1300 of FIG. 14 comprises at least one calculating unit 1302 and at least one memory unit 1304 associated with (i.e., usably by) said at least one calculating unit 1302 for at least temporarily storing a computer program PRG and/or data DAT, wherein said computer program PRG is e.g. configured to at least temporarily control an operation of the apparatus 100 according to the embodiments, e.g. the execution of a method according to the embodiments, for example selectively activating and/or deactivating at least one of said antenna modules 110, 120.

According to further preferred embodiments, said at least one calculating unit 1302 may comprise at least one of the following elements: a microprocessor, a microcontroller, a digital signal processor (DSP), a programmable logic element (e.g., FPGA, field programmable gate array), an ASIC (application specific integrated circuit), hardware circuitry. According to further preferred embodiments, any combination of two or more of these elements is also possible.

According to further preferred embodiments, the memory unit 1304 comprises at least one of the following elements: a volatile memory 1304a, particularly a random-access memory (RAM), a non-volatile memory 1304b, particularly a Flash-EEPROM. Preferably, said computer program PRG is at least temporarily stored in said non-volatile memory 1304b. Data DAT, which may e.g. be used for executing the method according to the embodiments, may at least temporarily be stored in said RAM 1304a.

According to further embodiments, an optional computer-readable storage medium SM comprising instructions, e.g. in the form of a further computer program PRG2, may be provided, wherein said further computer program PRG2, when executed by a computer, i.e. by the calculating unit 1302, may cause the computer 1302 to carry out the method according to the embodiments. As an example, said storage medium SM may comprise or represent a digital storage medium such as a semiconductor memory device (e.g., solid state drive, SSD) and/or a magnetic storage medium such as a disk or harddisk drive (HDD) and/or an optical storage medium such as a compact disc (CD) or DVD (digital versatile disc) or the like.

According to further preferred embodiments, the control unit 1300 may comprise a data interface 1306, preferably for bidirectional control and/or data exchange cx with said antenna modules 110, 120 and/or other devices 12, 14 (FIG. 6), e.g. for selectively activating and/or deactivating at least one of said antenna modules 110, 120 and/or components 11, 12a, . . . , 12d assigned thereto. Also, according to further exemplary embodiments, said data interface 1306 may be used to receive at least one received power parameter PPRX (e.g., from a BBU 14 and/or at least one radio unit 12, 12a, . . . ), which received power parameter PPRX may be used for selectively activating and/or deactivating at least one of said antenna modules 110, 120 and/or components 11, 12a, . . . , 12d assigned thereto, according to further exemplary embodiments.

As a further example, by means of said data interface 1306, also a data carrier signal DCS may be received, e.g. from an external device, for example via a wired or a wireless data transmission medium. According to further preferred embodiments, the data carrier signal DCS may represent or carry the computer program PRG according to the embodiments, or at least a part thereof.

Further preferred embodiments relate to a use of the apparatus according to the embodiments and/or of the method according to the embodiments and/or of the computer program according to the embodiments for a) extending a radio range of a mobile radio device 10, particularly of a terminal for a cellular communications network 20 and/or b) increasing a power efficiency of a mobile radio device 10, particularly of a terminal 10 for a cellular communications network 20.

The invention claimed is:

1. An apparatus for transmitting and receiving radio frequency (RF) signals (RFS), particularly for a mobile radio device for a wireless communications system, particularly a cellular communications system, said apparatus comprising:
a primary antenna module having a first radiation pattern;
at least one secondary antenna module having a second radiation pattern which is different from said first radiation pattern of said primary antenna module; and
a control unit configured to cause the apparatus to
determine a received power of a received RF signal associated with said primary antenna module, and a received power of a received RF signal associated with said at least one secondary antenna module,
determine whether said received power of said received RF signal associated with said at least one secondary antenna module is less than a first threshold,
activate said primary antenna module in response to determining that said received power of said received RF signal associated with said at least one secondary antenna module is less than said first threshold, and
deactivate said primary antenna module in response to determining that said received power of said received RF signal associated with said at least one secondary antenna module is greater than said first threshold.

2. The apparatus according to claim 1, wherein said first radiation pattern is an omnidirectional radiation pattern, and wherein said second radiation pattern is a non-omnidirectional radiation pattern.

3. The apparatus according to claim 1, wherein said primary antenna module comprises a monopole antenna.

4. The apparatus according to claim 1, wherein said at least one secondary antenna module comprises at least one linear antenna array having at least two more antenna elements.

5. The apparatus according to claim 1, wherein said primary antenna module and said at least one secondary antenna module are arranged on a common carrier element.

6. The apparatus according to claim 1, wherein said apparatus comprises at least two secondary antenna modules, wherein said control unit is configured to cause the apparatus to:
determine whether a received power of a received RF signal associated with one of said secondary antenna modules is greater than a second threshold; and
if said received power of said received RF signal associated with said one of said secondary antenna modules is greater than said second threshold, deactivate
a) at least one further secondary antenna module of said at least two secondary antenna modules, and
b) said primary antenna module.

7. The apparatus according to claim 1, wherein said control unit is configured to cause the apparatus to control an electric energy supply to said primary antenna module and to said at least one secondary antenna module.

8. A mobile radio device for a wireless communications system, particularly a cellular communications system, comprising:
at least one apparatus for transmitting and receiving radio frequency (RF) signals, particularly for a mobile radio device for a wireless communications system, particularly a cellular communications system, said apparatus comprising
a primary antenna module having a first radiation pattern, at least one secondary antenna module having a second radiation pattern, which is different from said first radiation pattern of said primary antenna module, and a control unit configured to cause the apparatus to
determine a received power of a received RF signal associated with said primary antenna module, and a received power of a received RF signal associated with said at least one secondary antenna module, determine whether said received power of said received RF signal associated with said at least one secondary antenna module is less than a first threshold, activate said primary antenna module in response to determining that said received power of said received RF signal associated with said at least one secondary antenna module is less than said first threshold, and deactivate said primary antenna module in response to determining that said received power of said received RF signal associated with said at least one secondary antenna module is greater than said first threshold.

9. The mobile radio device according to claim 8, wherein said radio device is configured to at least temporarily operate according to the standard 3GPP TS 38.331, V15.4.0, 2018-12, and to at least temporarily use at least said primary antenna module for a target cell search depending on synchronization signal blocks according to the standard 3GPP TS 38.331, V15.4.0, 2018-12.

10. A method of operating an apparatus for transmitting and receiving radio frequency (RF) signals, particularly for a mobile radio device for a wireless communications system, particularly a cellular communications system, said apparatus comprising a primary antenna module having a first radiation pattern, at least one secondary antenna module having a second radiation pattern, which is different from said first radiation pattern of said primary antenna module, and a control unit, wherein said method comprises:

determining a received power of a received RF signal associated with said primary antenna module, and a received power of a received RF signal associated with said at least one secondary antenna module;

determining whether said received power of said received RF signal associated with said at least one secondary antenna module is less than a first threshold;

activating said primary antenna module in response to determining that said received power of said received RF signal associated with said at least one secondary antenna module is less than said first threshold; and deactivating said primary antenna module in response to determining that said received power of said received RF signal associated with said at least one secondary antenna module is greater than said first threshold.

11. The method according to claim 10, wherein said apparatus comprises at least two secondary antenna modules, wherein said method further comprises:

determining, by said control unit, whether a received power of a received RF signal associated with one of said secondary antenna modules is greater than a second threshold; and if said received power of said received RF signal associated with said one of said secondary antenna modules is greater than said second threshold deactivating, by said control unit,
a) at least one further secondary antenna module of said at least two secondary antenna modules, and
b) said primary antenna module.

12. The apparatus according to claim 1, wherein the primary antenna module comprises a quarter wavelength monopole antenna.

13. The apparatus according to claim 4, wherein said at least two more antenna elements are patch antenna elements.

14. The apparatus according to claim 6, wherein, in response to said received power of said received RF signal associated with said one of said secondary antenna modules being less than said second threshold, said control unit is configured to cause the apparatus to:

activate at least one further secondary antenna module of said at least two secondary antenna modules; and
activate said primary antenna module.

15. The method according to claim 11, further comprising:

in response to said received power of said received RF signal associated with said one of said secondary antenna modules being less than said second threshold activating at least one further secondary antenna module of said at least two secondary antenna modules, and
activating said primary antenna module.

* * * * *